(12) United States Patent
Pfahler

(10) Patent No.: US 6,626,488 B2
(45) Date of Patent: Sep. 30, 2003

(54) CUSHION ASSEMBLY FOR A MOTOR VEHICLE SEAT

(75) Inventor: Karl Pfahler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/972,196

(22) Filed: Oct. 9, 2001

(65) Prior Publication Data
US 2002/0067058 A1 Jun. 6, 2002

(30) Foreign Application Priority Data
Oct. 6, 2000 (DE) .......................... 100 49 458

(51) Int. Cl.7 .............................................. A47C 31/00
(52) U.S. Cl. ............................ 297/180.11; 297/180.12; 297/180.14; 5/652.2
(58) Field of Search .................. 297/180.1, 180.11, 297/180.12, 180.13, 180.14, 452.42, 452.48, 452.44, 452.49; 5/652.1, 652.2, 726, 724, 653; 454/120, 907

(56) References Cited

U.S. PATENT DOCUMENTS

| | | | |
|---|---|---|---|
| 4,869,550 A | * | 9/1989 | Lorenzen et al. |
| 5,902,014 A | * | 5/1999 | Dinkel et al. ......... 297/452.43 |
| 5,934,748 A | * | 8/1999 | Faust et al. |
| 6,003,950 A | * | 12/1999 | Larsson |
| 6,019,420 A | * | 2/2000 | Faust et al. |
| 6,050,890 A | | 4/2000 | Bayer et al. |
| 6,186,592 B1 | * | 2/2001 | Orizaris et al. |
| 6,189,966 B1 | * | 2/2001 | Faust et al. |
| 6,196,627 B1 | * | 3/2001 | Faust et al. |
| 6,206,465 B1 | * | 3/2001 | Faust et al. |
| 6,224,150 B1 | * | 5/2001 | Eksin et al. |

FOREIGN PATENT DOCUMENTS

| | | |
|---|---|---|
| DE | 19745521 | 4/1999 |
| DE | 19643760 | 4/2000 |
| DE | 19941715 | 12/2000 |
| DE | 10010986 | 3/2001 |
| DE | 19745521 | 3/2001 |

* cited by examiner

Primary Examiner—Peter M. Cuomo
Assistant Examiner—Stephen Vu
(74) Attorney, Agent, or Firm—Crowell & Moring LLP

(57) ABSTRACT

A cushion for a motor vehicle seat includes a layer of ventilation fabric, through which air can flow, and miniature fans integrated into the cushion to blow air into the ventilation layer. The air is received in sleeves installed in ventilation channels which penetrate the cushion from a cushion bottom side and extend to an upper side of the ventilation layer. To achieve adequate cushion ventilation with low fan noise even when using thin fabric ventilation layers made of relatively hard material, the sleeves are closed on their upper end with a flange and are provided directly below the flange with oblong holes which extend in the circumferential direction and have a width measured in the axial direction which is equal to or less than the thickness of the layer of fabric.

12 Claims, 2 Drawing Sheets

CUSHION ASSEMBLY FOR A MOTOR VEHICLE SEAT

BACKGROUND AND SUMMARY OF THE DISCLOSURE

This application claims the priority of German Patent Application 100 49 458.7, filed Oct. 6, 2000, the disclosures of which is expressly incorporated by reference herein.

The invention relates to a cushion for a motor vehicle seat comprising a ventilation layer, through which air can flow; ventilation channels, which pass through the cushion from a cushion bottom side up to an upper side of the ventilation layer, facing away from the cushion bottom side; sleeves, which are inserted into respective ones of the ventilation channels, each with a protruding collar on its closed upper end which rests on the surface of the ventilation layer; each sleeve including a sleeve jacket segment which passes through the ventilation layer to air passage openings; and miniature fans which are received in respective ones of the sleeves.

In a prior art cushion as disclosed in German Patent Document No. DE 197 45 521 A1 and corresponding U.S. patent application Ser. No. 6,206,465 B1, the ventilation layer, through which air can flow, is made of a space fabric. Each miniature fan is installed in a cylindrical sleeve, whose front end, facing the ventilation layer, is designed as a funnel. The funnel exhibits such a shape that a part of the air flow, guided to the ventilation layer, enters into the open cross section of the ventilate layer and the rest enters into this ventilation layer on the bottom side. Each sleeve is installed into a ventilation channel, which passes through a foam pad received by a cushion support, and empties, on the one hand, into the ventilation layer and, on the other hand, into the bottom side of the foam pad, facing away from the ventilation layer.

It has already been proposed for the class of cushion described above in German Patent Document No. DE 199 41 716.4 that the characteristics of the sleeves, receiving the miniature fans can be optimized with a thick ventilation layer made of rubberized hair filaments, alone or in combination with a warp-knitted fabric such that the sleeves are flexible in the axial and radial direction, e.g. by making the sleeves of rubber and by integrating spring bellows into the central sleeve section. In this manner, the miniature fans are held in the cushion without any force by means of the sleeves. Thus, in the occupied state of the cushion, the sleeves can slide in it without any shear forces acting on the sleeve and the fan housing. In the case of a seat load, the cushion and sleeve can be moved in relation to each other so that stress on the seat does not result in rattling noises. Due to the elasticity of the sleeve in the longitudinal and cross direction, the sleeves are flexible both with an axial load and with a cross load on the cushion.

A problem addressed by the invention is to realize, for a cushion with active ventilation of the aforementioned type, an integration of the miniature fans that guarantees the mostly noiseless operation of the miniature fans in the cushion even with the use of a thin ventilation layer made of a cushion material that is harder than rubberized hair filaments.

The invention solves this problem by providing a cushion for a motor vehicle seat comprising a ventilation layer, through which air can flow; ventilation channels, which pass through the cushion from a cushion bottom side up to an upper side of the ventilation layer, facing away from the cushion bottom side; sleeves, which are inserted into respective ones of the ventilation channels, each with a protruding collar on its closed upper end which rests on the surface of the ventilation layer; each sleeve including a sleeve jacket segment which passes through the ventilation layer to air passage openings; and miniature fans which are received in respective ones of the sleeves; wherein the ventilation layer is formed exclusively by a layer of fabric, the sleeves are designed rigidly in axial and radial directions, and the air passage openings in the sleeve jackets are formed by oblong holes which extend in the circumferential direction of the sleeve and have a hole width measured in an axial direction of the sleeve equal to or smaller than the thickness of the layer of fabric.

The cushion, according to the invention, has an advantage that in the case of a thin layer of warp-knitted fabric, used for reasons relating to space and cost, an optimal supply of air to the layer of fabric is guaranteed by means of the stiff sleeves which are installed into the layer of fabric. Another advantage of the cushion according to the invention is that shear forces, which are generated in the relatively stiff layer of fabric due to a load on the cushion, cannot effect a deformation of the sleeves, thereby relieving the miniature fans of any mechanical load. Hence, no rattling noises are produced, and the ventilation does not fail due to the fan wheels of the miniature fans jamming.

The preferred sleeves, which are made of plastic, exhibit only very little wall thickness despite their rigidity. They can be integrated into the layer of fabric so as to be compact, inconspicuous, and not very thick. The oblong holes in the sleeve jacket segment in the layer of fabric are designed in such a manner that, on the one hand, they enable adequate ventilation of the layer of fabric and, on the other hand, guarantee adequate rigidity of the sleeve.

Other objects, advantages and novel features of the present invention will become apparent from the following detailed description of the invention when considered in conjunction with the accompanying drawings.

DETAILED DESCRIPTION OF THE DRAWINGS

The motor vehicle seat exhibits in the well-known manner a seat element, held on the vehicle floor so as to be adjustable, and a backrest. The backrest is connected to the seat element so that the tilt can be adjusted by means of swivel locking means. Both seat element and backrest are furnished with a cushion.

Figure 1:
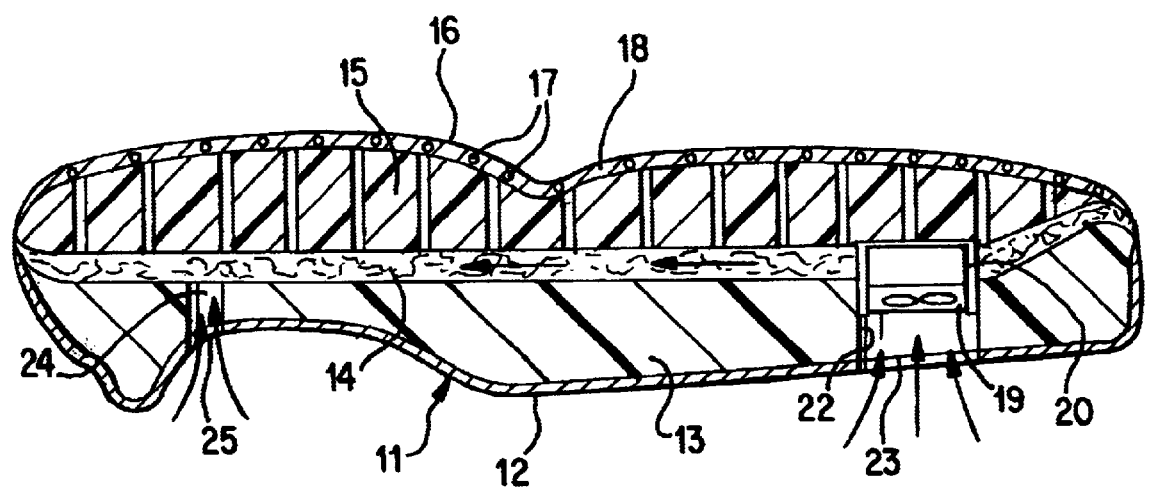
FIG. 1 is a longitudinal view of a seat element of a motor vehicle seat.

In the seat element of the motor vehicle seat depicted in FIG. 1, the cushion is attached to a cushion support 11, which is designed here as a seat shell 12. The cushion comprises a foam block 13, lying on the cushion support 11; a thin layer of fabric 14, through which air can flow, which covers the entire area of the foam block 13 and which serves as the ventilation or air guide layer of the active ventilation of the cushion; a perforated layer of foam 15 covering the layer of fabric 14; and a cushion cover 16, through which air can flow and which spans the layer of foam 15. Between the foam layer 15 and the cushion cover 16 there is an electric seat heater 17, which is embedded in a cover filling 18.

For active ventilation of the cushion, several miniature ventilators or miniature fans 19 are integrated into said cushion. FIG. 1 shows only one miniature fan 19. Yet several miniature fans 19 are spaced apart side by side when viewed from the direction of the seat width. Each miniature fan 19 is suspended with its fan housing in a plastic cylindrical sleeve 20 so as to damp the vibration. This state is depicted in the enlarged perspective view in FIG. 2. The vibration damped suspension can be effected, for example, as described in German Patent Document No. DE 196 43 760 C1 and corresponding U.S. Pat. No. 6,050,890. The miniature fan 19 is suspended from or in the vicinity of the bottom end of the sleeve 20 as shown in the schematic drawing in FIG. 1.

Several ventilation channels 22 are provided in the rear area of the cushion as a function of the number of miniature fans 19 to be installed in the cushion. Said ventilation channels pass through the foam block 13 and the layer of fabric 14 and empty, on the one hand, into the bottom side of the foam block 13 and, on the other hand, into the upper side of the layer of fabric 14 which faces away from said bottom side of the foam block. A fresh air opening 23 in the seat shell 12 is arranged congruent with each ventilation channel 22. Furthermore, the front area of the cushion has air extracting channels 24, which pass through the entire foam block 13, and empty, on the one hand, into the bottom side of the layer of fabric 14 which faces the foam block 13, and empty, on the other hand, into the bottom side of the foam block 13, facing away from the layer of fabric 14. Air exhaust openings 25, which are congruent with the air extracting channels 24, are arranged in the seat shell 12.

The ventilation channels 22 have a clear diameter, which in the area of the layer of fabric 14 is slightly greater than the outside diameter of the sleeve 20. Thus, the sleeve 20 can be installed, starting from the top side of the layer of fabric 14 into the ventilation channel 22 so as to hold its shape. Preferably, the diameter of the ventilation channel 22 in the area of the foam block 13 is selected so as to be slightly larger than the outside diameter of the sleeve 20. Thus, between the sleeve 20 and the foam block 13, there is adequately large clearance.

Figure 2:
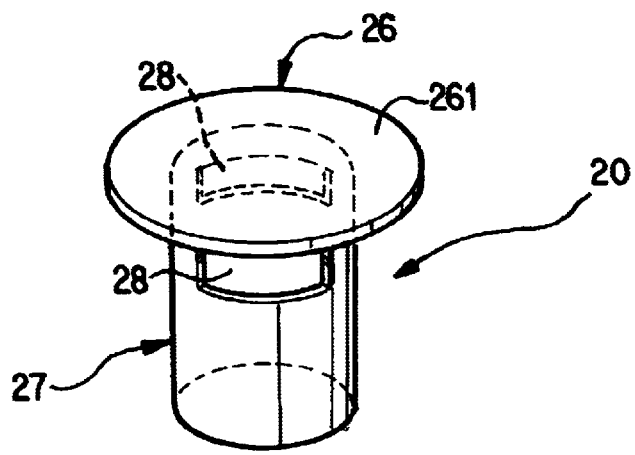
FIG. 2 is an enlarged perspective view of one of the sleeves that is integrated into the cushion and intended to receive a miniature fan.

As evident from FIG. 2, the sleeve 20 is clod on its upper end, which faces away from the attachment region of the miniature fans 19, with a flange 26, which projects radially beyond the sleeve jacket 27. Following insertion into the ventilation channel 22, the sleeve 20 rests with said annular protruding collar 261 on the upper side of the layer of fabric 14. After the perforated foam layer 15 is laid on the layer of fabric 14, the flange 26 is fixed in position between the foam layer 15 and the layer of fabric 14 once the cushion cover 16 is pulled over. Thus, the sleeve 20 is fixed in position in the ventilation channel 22. Air passage openings are worked in the form of oblong holes 28 into the sleeve jacket 27 directly below the flange 26, and, in particular, in the sleeve segment embedded in the layer of fabric 14. Said oblong holes extend in the circumferential direction and exhibit a width measured in the axial direction of the sleeve 20 which is equal to or less than the thickness of the layer of fabric 14. The oblong holes 28 are designed in such a manner that, on the one hand, the layer of fabric 14 can be supplied maximally with air through said holes and, on the other hand, the sleeve 20 still has the necessary mechanical stability.

Figure 3:
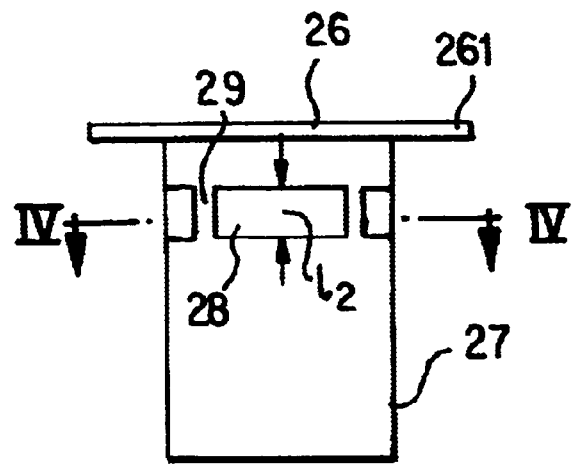
FIG. 3 schematically depicts preferred ranges of dimensions for the sleeves at FIGS. 1 and 2.
Figure 4:
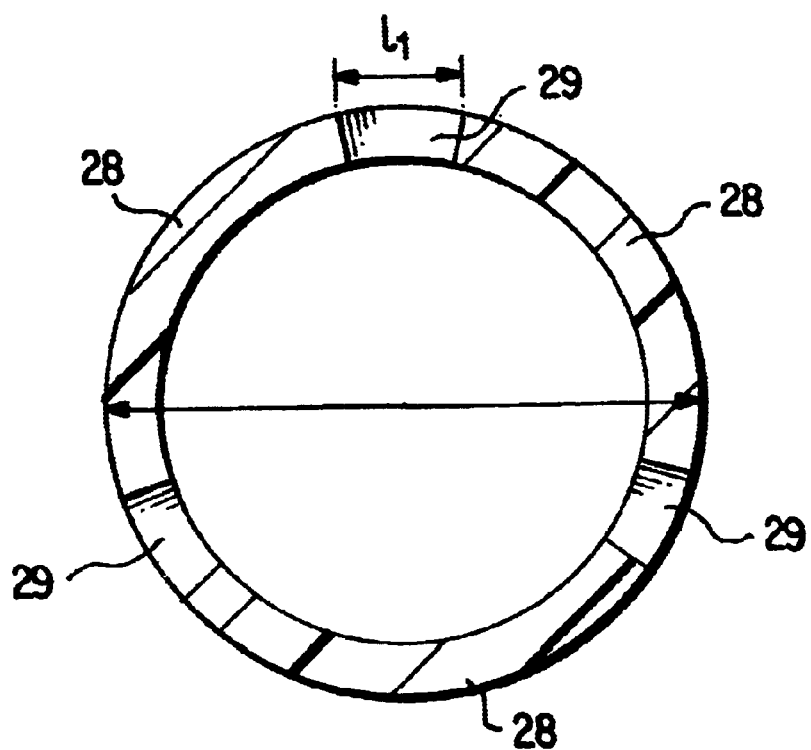
FIG. 4 is a cross-sectional view of the sleeve depicted in FIG. 3 taken along section IV—IV.

FIGS. 3 and 4 schematically depict dimensional ranges for preferred embodiments of the sleeve jacket. The preferable sleeve jacket 27 has a diameter D of between 20 to 50 millimeters. The preferable sleeve jacket 27 has three oblong holes 28 spaced equally apart around the circumference of the sleeve jacket. The sleeve jacket section 29 separating the three oblong holes has a preferred width $L_1$ between 10–25 millimeters with 10–15 millimeters being an especially preferred range. The vertical height $L_2$ of the oblong holes 28 is preferably substantially the same height as the thickness of the fabric ventilation layer 14 with the preferred thickness of the fabric ventilation layer being between 5–30 millimeters. A fabric ventilation layer thickness of 10–25 millimeters is more preferred with a thickness of 10–11 millimeters being most preferred. These preferred ranges of dimensions for the sleeve jacket 27, the oblong holes 28, and the fabric ventilation layer 14 are suggested to optimize the stability of the structure while accommodating active ventilation of the cushion.

When the miniature fans 19 are switched on for the purpose of actively ventilating the cushion, the miniature fans 19 draw in air from the floor space below the seat element and force it through the oblong holes 28 into the layer of fabric 14. The air flows through the layer of fabric 14 and exits again—primarily with a seat load—by way of the air extracting channels 24. In the unoccupied seat element a fraction of the air flows out through the perforated foam layer 15 and the cushion cover 16, through which air can flow, so that the surface of the cushion is cooled.

The described cushion is provided primarily for installation in the seat element or seat pillow of the motor vehicle seat, but can form just as well the cushion of the backrest.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A cushion for a motor vehicle seat, comprising:
   a ventilation layer allowing air to flow through;
   ventilation channels, which pass through the cushion from a cushion bottom side up to an upper side of the ventilation layer, facing away from the cushion bottom side;
   sleeves being inserted into said respective ventilation channels, wherein each of the channels have a protruding collar on a closed upper end which rests on the surface of the ventilation layer; each of said sleeves including a sleeve jacket segment which passes through the ventilation layer to air passage openings; and
   miniature fans being received in said respective sleeves;
   wherein the ventilation layer is formed exclusively by a thin layer of fabric,
   wherein the sleeves are designed rigidly in axial and radial directions, and
   wherein the air passage openings in the sleeve jacket segments are formed by oblong holes which extend in a circumferential direction of the sleeve, each of the holes having a width measured in an axial direction of the sleeve at least equal to or smaller than the thickness of the layer of fabric.

2. The cushion for a motor vehicle seat according to claim 1,
   wherein the protruding collar is made as a one piece flange at the upper end of the sleeves.

3. The cushion for a motor vehicle seat according to claim 2, wherein the miniature fans are suspended adjacent the end of the sleeves, facing away from the flange, so as to damp the vibration of the miniature fans.

4. The cushion for a motor vehicle seat according to claim 1, wherein the sleeves are made of plastic.

5. The cushion for a motor vehicle seat according to claim 1, wherein the upper side of the layer of fabric is overlaid with a perforated foam layer, whereby a cushion cover spins over it to allow air flows.

6. The cushion for a motor vehicle seat according to claim 5, wherein the sleeves are each clamped by way of a flange between the perforated foam layer and the layer of fabric, and wherein the sleeve jackets project into the ventilation channels with clearance.

7. The cushion for a motor vehicle seat according to claim 5, wherein an electric seat heater is disposed between the perforated foam layer and the cushion cover.

8. The cushion for a motor vehicle seat according to claim 6, wherein an electric seat heater is disposed between the perforated foam layer and the cushion cover.

9. The cushion for a motor vehicle seat according to claim 1, wherein the layer of fabric rests on a foam block, received by a cushion support, and wherein the ventilation channels, continue in the foam block, and empty into fresh air openings provided in the cushion support.

10. The cushion for a motor vehicle seat according to claim 9, wherein channel segments, which belong to the ventilation channels and pass through the foam block, exhibit an inside diameter that is greater than an outside diameter of the sleeves.

11. The cushion for a motor vehicle seat according to claim 9, wherein the cushion support is a seat shell.

12. The cushion for a motor vehicle seat according to claim 9, wherein the fresh air openings are provided in the cushion shell of the cushion support.

* * * * *